United States Patent
Suwa et al.

(10) Patent No.: US 7,682,713 B2
(45) Date of Patent: Mar. 23, 2010

(54) MAGNETIC RECORDING MEDIUM WITH RECORDING LAYER HAVING A PREDETERMINED CONCAVO-CONVEX PATTERN AND MAGNETIC RECORDING AND REPRODUCING APPARATUS

(75) Inventors: Takahiro Suwa, Chuo-ku (JP);
Kazuhiro Hattori, Chuo-ku (JP);
Shuichi Okawa, Chuo-ku (JP)

(73) Assignee: TDK Corporation, Tokyo (JP)

( * ) Notice: Subject to any disclaimer, the term of this patent is extended or adjusted under 35 U.S.C. 154(b) by 1148 days.

(21) Appl. No.: 11/222,761

(22) Filed: Sep. 12, 2005

(65) Prior Publication Data

US 2006/0172154 A1    Aug. 3, 2006

(30) Foreign Application Priority Data

Feb. 1, 2005    (JP)    ............................. 2005-025645

(51) Int. Cl.
*G11B 7/24*    (2006.01)
*G11B 5/82*    (2006.01)
*G11B 3/68*    (2006.01)
*G11B 3/70*    (2006.01)

(52) U.S. Cl. .................... 428/848.5; 428/848; 428/821; 428/825; 428/825.1; 360/55; 360/48

(58) Field of Classification Search ................ 428/848, 428/65.5, 141, 826, 836, 833.1, 834, 835.5; 360/48, 55

See application file for complete search history.

(56) References Cited

U.S. PATENT DOCUMENTS

| | | | |
|---|---|---|---|
| 4,935,278 A | 6/1990 | Krounbi et al. | |
| 5,499,731 A | 3/1996 | Marshall | |
| 5,714,207 A | 2/1998 | Kuo | |
| 6,014,296 A | 1/2000 | Ichihara et al. | |
| 6,351,339 B1* | 2/2002 | Bar-Gadda | 360/55 |
| 6,535,343 B1* | 3/2003 | Bar-Gadda | 360/55 |
| 6,583,957 B1 | 6/2003 | Takeshita et al. | |
| 6,586,044 B1 | 7/2003 | Takeshita et al. | |
| 7,244,521 B2* | 7/2007 | Liu et al. | 428/833.3 |
| 2005/0196650 A1* | 9/2005 | Suwa et al. | 428/848 |

FOREIGN PATENT DOCUMENTS

| | | |
|---|---|---|
| JP | A 1-279421 | 11/1989 |
| JP | A 9-97419 | 4/1997 |
| JP | A 2000-195042 | 7/2000 |
| JP | 2000-293842 | 10/2000 |
| JP | 2005-026359 | 1/2005 |
| JP | 2006-48751 | 2/2006 |
| JP | 2006-048812 | 2/2006 |
| WO | WO 99/59194 | 11/1999 |
| WO | WO 2005001919 A1 * | 1/2005 |

* cited by examiner

*Primary Examiner*—Callie E Shosho
*Assistant Examiner*—Frank D Ducheneaux
(74) *Attorney, Agent, or Firm*—Oliff & Berridge, PLC

(57) ABSTRACT

The magnetic recording medium includes: recording elements formed as the convex portions of the recording layer formed in the predetermined concavo-convex pattern over a substrate; and a filling elements with which a concave portions between the recording elements are filled. A surface concave portion is formed in a surface of the magnetic recording medium above the recording element. The surface concave portion has a cross-sectional shape of which a portion corresponding to a center of the recording element lying thereunder in a width direction thereof is recessed deepest toward the substrate, and has a width monotonically increasing with increase of a distance from the substrate.

17 Claims, 9 Drawing Sheets

MAGNETIC RECORDING MEDIUM WITH RECORDING LAYER HAVING A PREDETERMINED CONCAVO-CONVEX PATTERN AND MAGNETIC RECORDING AND REPRODUCING APPARATUS

BACKGROUND OF THE INVENTION

1. Field of the Invention

The present invention relates to a magnetic recording medium including a recording layer formed in a predetermined concavo-convex pattern in which recording elements form convex portions, and a magnetic recording and reproducing apparatus including that magnetic recording medium.

2. Description of the Related Art

Conventionally, in a magnetic recording medium such as a hard disk, various types of development such as miniaturization of magnetic particles forming a recording layer, change of a material for the magnetic particles, and miniaturization of head processing have been made to largely improve areal density of the recording layer. The improvement of the areal density is expected to continue. However, many problems including the limitation of the magnetic head processing, improper recording of information onto a track adjacent to a target track caused by broadening of a magnetic field, crosstalk during reproducing, and the like are made apparent. Thus, the improvement of the areal density by the conventional development approach has reached the limit.

Therefore, a magnetic recording medium such as a discrete track medium and a patterned medium, that includes a recording layer formed in a concavo-convex pattern in which recording elements form convex portions, has been proposed as a candidate of a magnetic recording medium that enables further improvement of the areal density (see Japanese Patent Laid-Open Publication No. Hei 9-97419, for example). As the areal density becomes higher, the magnetic gap between a magnetic head and a magnetic recording medium becomes smaller. Thus, in case of a magnetic recording medium that is expected to have the areal density of 200 Gbpsi or more, such as a discrete track medium or a patterned medium, a guideline is issued that the magnetic gap between the magnetic head and the magnetic recording medium should be set to 15 nm or less.

Moreover, in a magnetic recording medium such as a hard disk, flatness of its surface is important in order to suppress crash of the magnetic recording medium against the magnetic head. The flatness of the surface is more important especially in a discrete track medium or a patterned medium that has high areal density and a small magnetic gap. Thus, it is preferable to fill concave portions between recording elements with a non-magnetic filling element and flatten a top surface of the recording elements and filling elements. Deposition methods such as sputtering, CVD(Chemical Vapor Deposition), and IBD (Ion Beam Deposition) can be used for filling the concave portions with the filling element. Moreover, processing methods such as CMP (Chemical Mechanical Polishing) and dry etching can be used for flattening the top surface of the recording elements and filling elements (see Japanese Patent Laid-Open Publication No. Hei 12-195042 and Japanese National Publication of PCT application No. 14-515647, for example).

However, when the surface of the magnetic recording medium is excessively flat, stiction of the magnetic head onto the surface of the magnetic recording medium can easily occur and therefore crash of the magnetic recording medium against the magnetic head can easily occur. In order to prevent the crash caused by the head stiction, according to the conventional technique, a texture process is performed for a surface of a substrate and a recording layer and other layers are sequentially deposited over that surface, thereby forming a fine concavo-convex pattern on the surface of the magnetic recording medium to follow the texture pattern on the substrate (see U.S. Pat. Nos. 5,499,731, 5,714,207, for example). Moreover, in case of a discrete track medium or a patterned medium, a structure is known in which a step is provided between the top surface of the recording elements and the top surface of the filling elements (see Japanese Patent Laid-Open Publication No. Hei 1-279421, for example). This step provides a texture effect.

However, when the fine concavo-convex pattern is formed on the surface of the magnetic recording medium by performing the texture process for the substrate, distortion like undulation having a period of about 100 nm to about 2 μm occurs on the surface of the magnetic recording medium. It is difficult for the magnetic head to follow and fly above the undulation-like distortion having the above period. Moreover, that distortion directly leads to variation in the size of the magnetic gap. In a magnetic recording medium of an earlier generation for which the magnetic gap of 25 nm or more is ensured, the aforementioned variation in the size of the magnetic gap does not matter practically. However, in a magnetic recording medium having the magnetic gap of 15 nm or less, the aforementioned variation in the size of the magnetic gap has effects that are practically unacceptable.

Moreover, even if the texture process is performed for the surface of the substrate, when spaces between the recording elements are filled with the filling element and the top surface of the recording elements and filling elements is flattened, the fine concavo-convex pattern following the texture pattern on the substrate is removed. Thus, it is difficult to form a fine concavo-convex pattern in a desired manner on the surface of the magnetic recording medium by using the technique of performing the texture process.

Furthermore, in the technique of forming the steps between the top surface of the recording element and the top surface of the filling element, the flying of the magnetic head becomes unstable because the rigidity of an air layer between the magnetic head and the surface of the magnetic recording medium becomes excessively small. Thus, the flying height of the magnetic head can be easily and largely changed by external disturbance and therefore sufficient reliability cannot be achieved.

SUMMARY OF THE INVENTION

In view of the foregoing problems, various exemplary embodiments of this invention provide a magnetic recording medium that includes a recording layer formed in a predetermined concavo-convex pattern in which recording elements form convex portions, has high areal density, hardly causes crash against a magnetic head, and has high reliability; and to provide a magnetic recording and reproducing apparatus including the above magnetic recording medium.

Various exemplary embodiments of the present invention achieve the above object by forming surface concave portions in a surface of a magnetic recording medium above recording elements, each of which has a cross-sectional shape of which a portion corresponding to a center of the recording element lying thereunder in a width direction thereof is recessed deepest toward a substrate, and has a width monotonically increasing with increase of a distance from the substrate.

Crash of a magnetic head caused by stiction can be prevented by forming the surface concave portions in the surface of the magnetic recording medium above the recording element so as to be recessed toward the substrate.

Moreover, the volume of the surface concave portions determines the rigidity of an air layer between the magnetic recording medium and the magnetic head. Since each surface concave portion has a cross-sectional shape of which a portion corresponding to a center of the recording element lying thereunder in a width direction thereof is recessed deepest toward the substrate, and has a width monotonically increasing with increase of a distance from the substrate, the volume of the surface concave portions is suppressed to be small. This makes the rigidity of the air layer between the magnetic head and the magnetic recording medium higher. Thus, variation in a flying height of the magnetic head can be suppressed.

In addition, a portion around the center of the recording element in the width direction is mainly used for recording of information. Since each surface concave portion has a cross-sectional shape of which a portion corresponding to a center of the recording elements lying thereunder in a width direction thereof is recessed deepest toward the substrate, and has a width monotonically increasing with increase of a distance from the substrate, the center of the recording element that is mainly used for recording of information can be protected from contact with the magnetic head even if the magnetic head comes into contact with the surface of the magnetic recording medium.

Accordingly, various exemplary embodiments of the present invention provide a magnetic recording medium comprising:

recording elements formed as a convex portion of a recording layer that is formed in a predetermined concavo-convex pattern over a substrate; and filling elements with which a concave portions between the recording elements are filled, wherein a surface concave portion is formed in a surface of the magnetic recording medium above the recording element, the surface concave portion having a cross-sectional shape of which a portion corresponding to a center of the recording element lying thereunder in a width direction thereof is recessed deepest toward the substrate, and has a width monotonically increasing with increase of a distance from the substrate.

In the present application, the "recording layer formed in a predetermined concavo-convex pattern over a substrate" shall refer to a recording layer obtained by dividing a continuous recording layer into a number of recording elements in the predetermined pattern, a recording layer obtained by partially dividing a continuous recording layer in the predetermined pattern and has partially continuous recording elements, a recording layer continuously formed over a part of the substrate such as a spirally formed recording layer, or a continuous recording layer including both a convex portion and a concave portion.

In the present application, the "surface above recording element" shall refer to a top surface of an uppermost layer 114 above recording element 106A in the case where a top surface of the recording element 106A is completely covered with one or more layers, as shown in FIG. 18. In the case where a part of the top surface of the recording element is exposed whereas the remaining part is covered with one or more layers, the above phrase shall refer to the top surface of the exposed recording element and the top surface of the uppermost layer. In the case where the top surface of the recording element is completely exposed, the phrase shall refer to the top surface of the recording element. The above definition can also be applied to the "surface above a protective film" and the "surface above filling element." Incidentally, in the case where the protective film 112 is formed not only on the recording element 106A but also on side faces of the recording element 106A, as shown in FIG. 18, the surface above the protective film 112 between the top surface of the recording element 106A and the top surface of the filling element 104 is included in the "surface above recording element" in the present application.

In the present application, the "depth of surface concave portion" shall refer to a length in a thickness direction from a highest portion 110a of the surface above the recording element 106A that is corresponding to the surface concave portion 100 (i.e., a portion that is the farthest from the substrate 102) to a lowest portion 110b of the surface concave portion 100, as shown with Dr in FIG. 18.

In the present application, the "step height between a surface above recording element and that above filling element" shall refer to a length in the thickness direction between the highest portion 110a of the surface of the magnetic recording medium 108 above the recording element 106A and a highest portion of the surface above the adjacent filling element 104, as shown with S in FIG. 18. Please note that FIG. 18 shows a case in which the highest portion 110a of the surface above the recording element 106A is higher than the highest portion of the surface above the filling element 104 and a case in which the highest portion 110a above the recording element 106A is lower than the highest portion above the filling element 104 in the same drawing in order to describe the meaning of the "step height between the surface above the recording element and the surface above the filling element".

In the present application, the "width direction of a recording element" shall refer to a direction in which the top surface of the recording element has the smallest width. For example, in case of a discrete track medium in which recording elements are arranged to form a circular track, the width direction of the recording element is a radial direction of the circular track.

In the present application, the "surface concave portion having a cross-sectional shape of which a portion corresponding to a center of the recording element lying thereunder in a width direction thereof is recessed deepest toward a substrate, and has a width monotonically increasing with increase of a distance from the substrate" shall refer to a concave portion having a cross-sectional shape in which a bottom is inclined to come away from the substrate from its center in the width direction to both sides of the width direction, e.g., a V-shape, a U-shape, and a shape of a circular arc or the like.

In the present application, the term "magnetic recording medium" shall refer to not only a medium that only uses magnetism for recording and reproducing information, such as a hard disk, a FLOPPY (Registered Trade Mark) disk, and a magnetic tape, but also a magneto-optical recording medium that uses magnetism and light together, such as MO (Magneto Optical), and a heat assisted recording medium that uses magnetism and heat together.

DETAILED DESCRIPTION OF THE PREFERRED EMBODIMENT

Preferred exemplary embodiments of the present invention will now be described with reference to the drawings.

Figure 1:
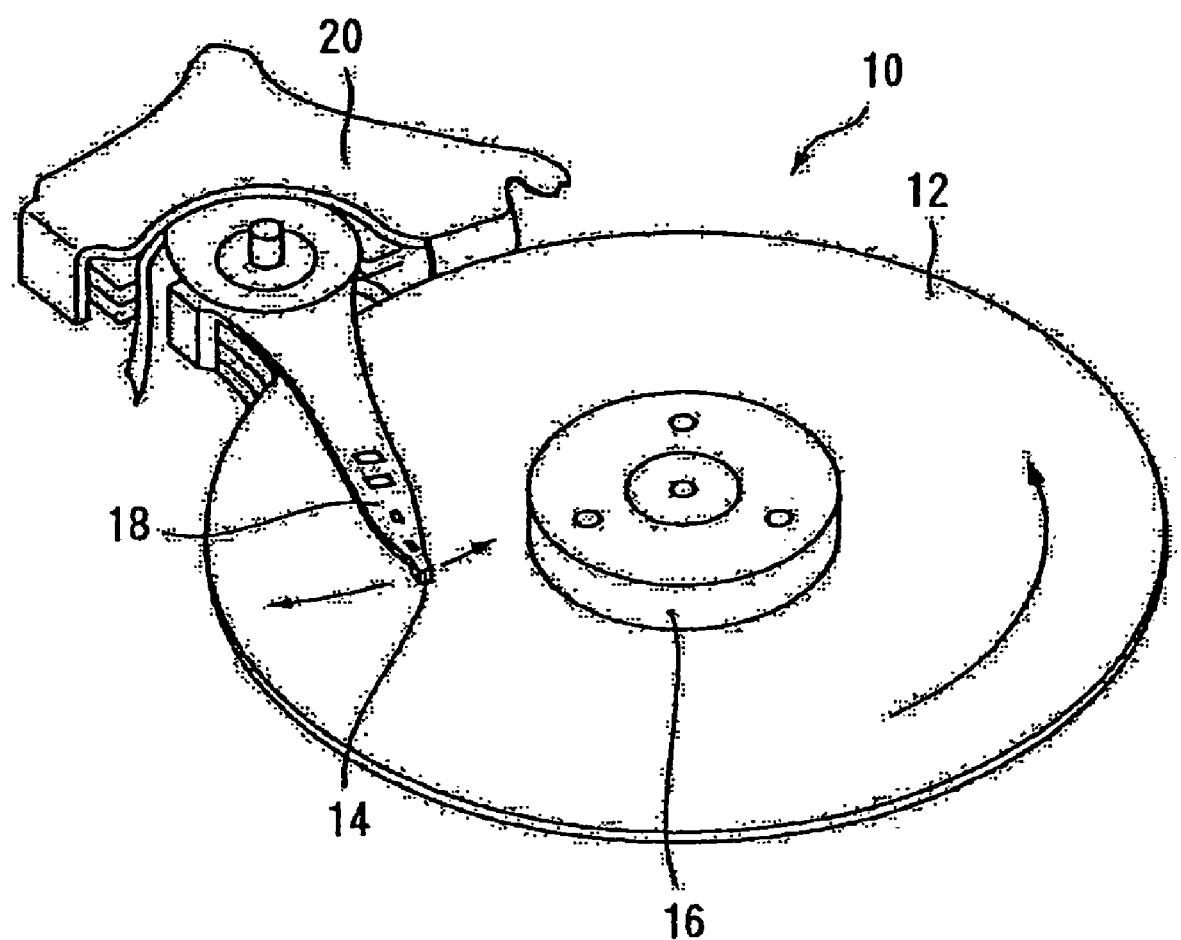
FIG. 1 is a perspective view schematically showing the general structure of a main part of a magnetic recording and reproducing apparatus according to a first exemplary embodiment of the present invention.

As shown in FIG. 1, a magnetic recording and reproducing apparatus 10 according to a first exemplary embodiment of the present invention includes a magnetic recording medium 12 and a magnetic head 14. The magnetic head 14 is arranged to be flyable close to a surface of the magnetic recording medium 12 for performing recording/reproducing of data for the magnetic recording medium 12. The magnetic recording and reproducing apparatus 10 has a feature in the structure of the magnetic recording medium 12. Except for the structure of the magnetic recording medium 12, the detailed description of the structure of the magnetic recording and reproducing apparatus 10 is appropriately omitted because it does not seem necessary for understanding the present exemplary embodiment.

The magnetic recording medium 12 is fixed to a chuck 16 and is rotatable together with the chuck 16. The magnetic head 14 is attached to an arm 18 at a portion near the tip end of the arm 18. The arm 18 is attached to a base 20 to be rotatable. In this manner, the magnetic head 14 can move in a flying state above the surface of the magnetic recording medium 12 along a circular route in the radial direction of the magnetic recording medium 12.

Figure 2:
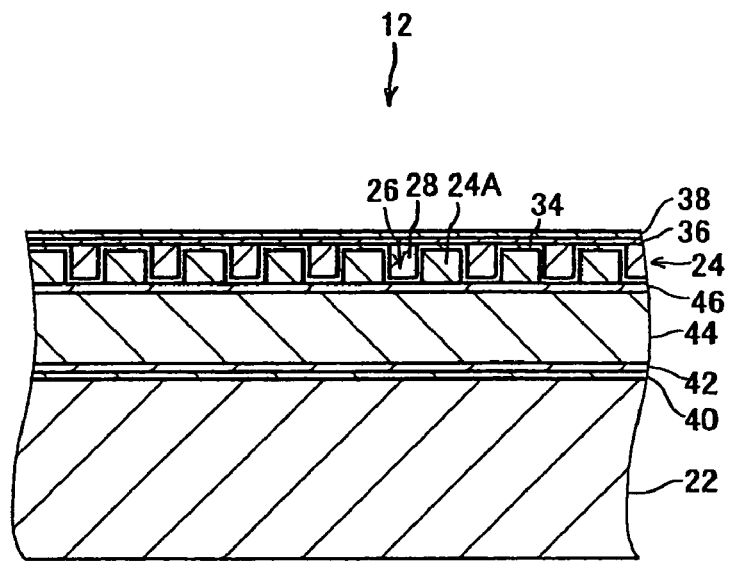
FIG. 2 is a side cross-sectional view schematically showing the structure of a magnetic recording medium of the above magnetic recording and reproducing apparatus.
Figure 3:
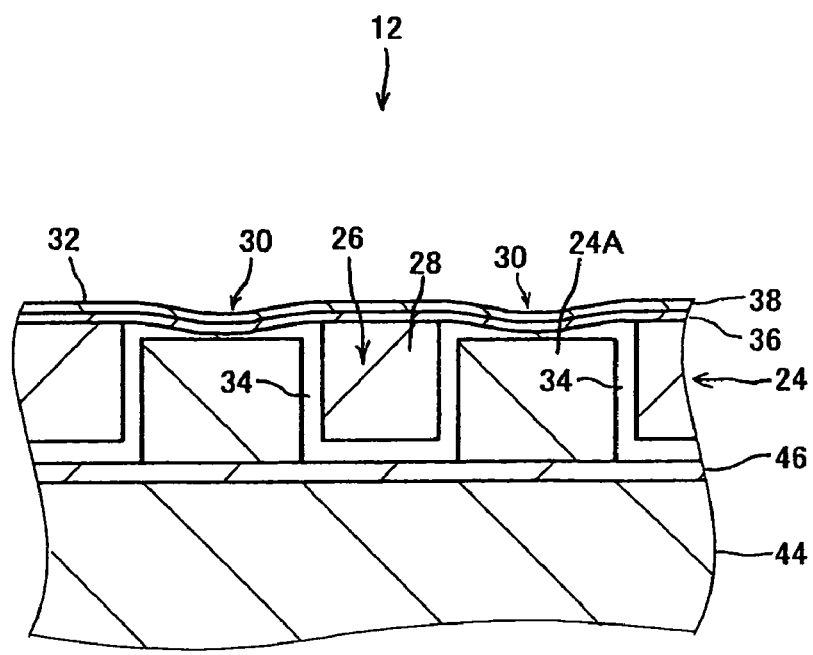
FIG. 3 is an enlarged side cross-sectional view schematically showing the structure of the magnetic recording medium around recording elements.
Figure 4:
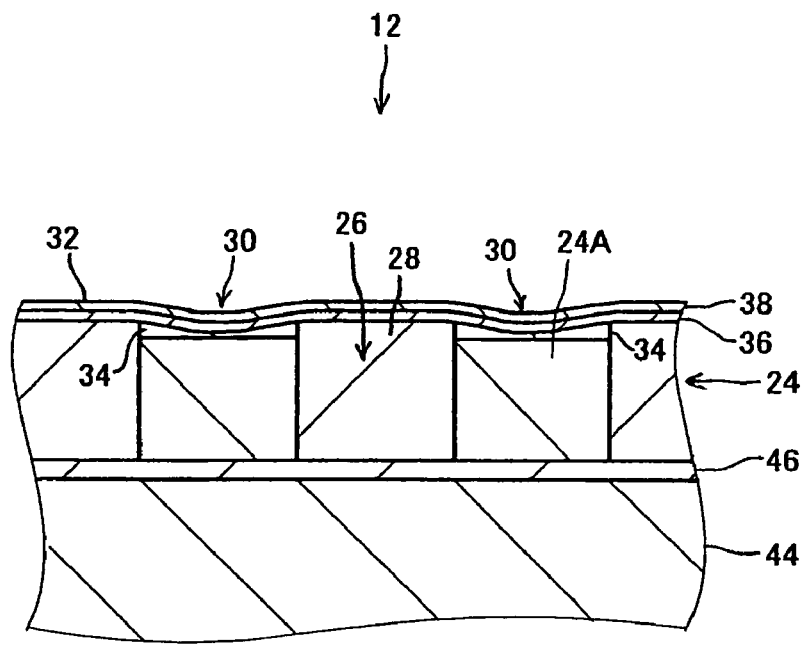
FIG. 4 is an enlarged side cross-sectional view schematically showing the structure of a magnetic recording medium around recording elements according to a second exemplary embodiment of the present invention.
Figure 5:
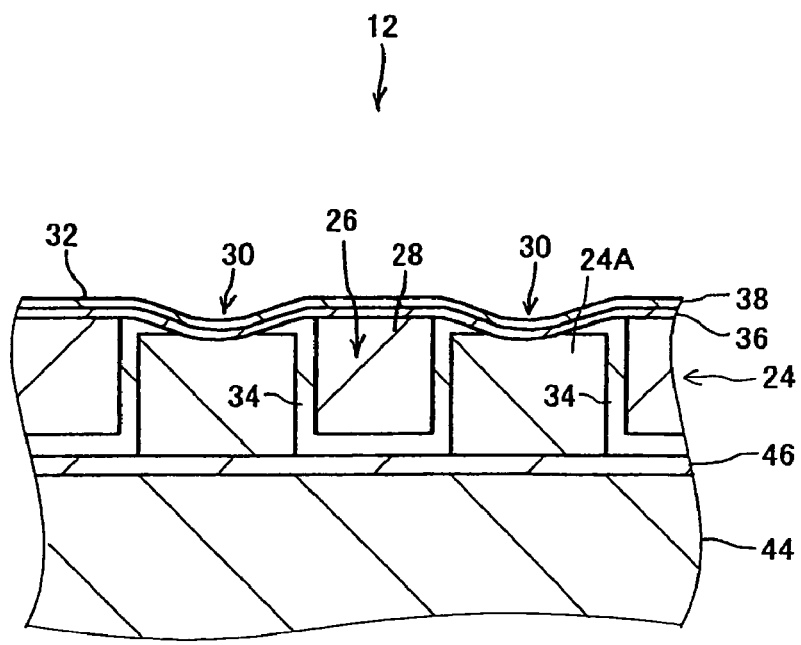
FIG. 5 is an enlarged side cross-sectional view schematically showing the structure of a magnetic recording medium around recording elements according to a third exemplary embodiment of the present invention.
Figure 6:
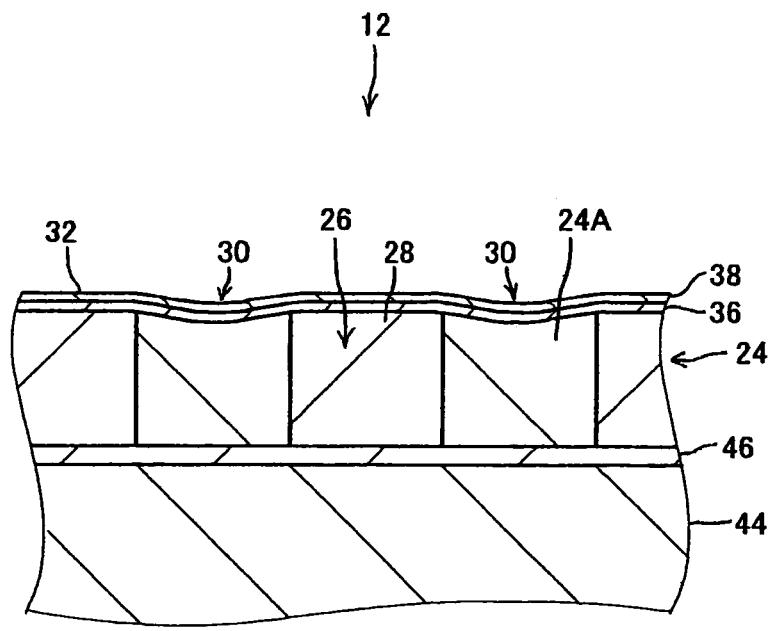
FIG. 6 is an enlarged side cross-sectional view schematically showing the structure of a magnetic recording medium around recording elements according to a fourth exemplary embodiment of the present invention.
Figure 7:
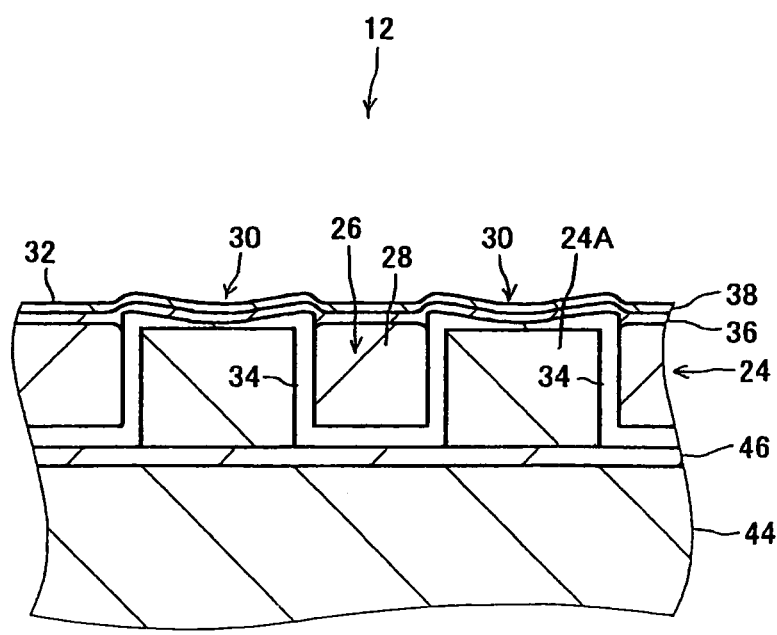
FIG. 7 is an enlarged side cross-sectional view schematically showing the structure of a magnetic recording medium around recording elements according to a fifth exemplary embodiment of the present invention.
Figure 8:
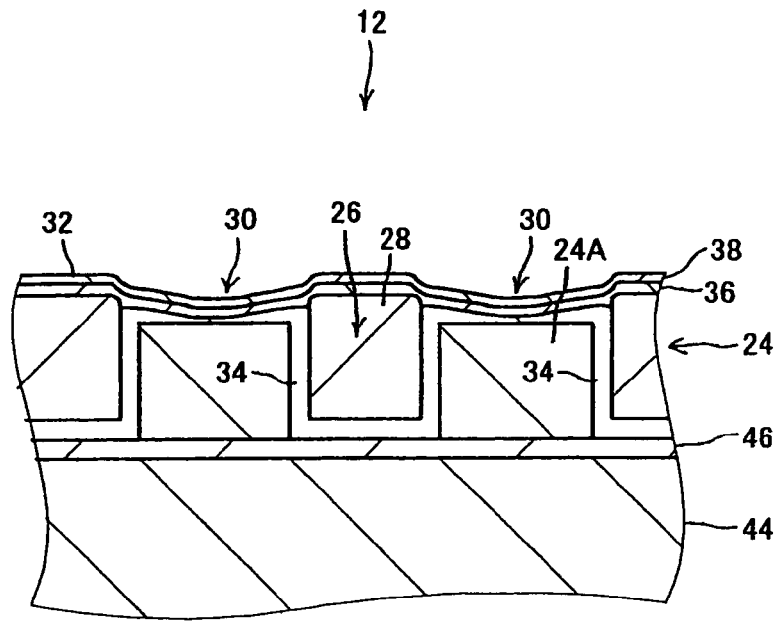
FIG. 8 is an enlarged side cross-sectional view schematically showing the structure of a magnetic recording medium around recording elements according to a sixth exemplary embodiment of the present invention.

The magnetic recording medium 12 is a perpendicular recording type discrete track medium having a shape of a circular plate. As shown in FIG. 2, the magnetic recording medium 12 includes a recording layer 24 formed in a predetermined concavo-convex pattern over a substrate 22. The magnetic recording medium 12 has recording elements 24A formed as convex portions of the recording layer 24 and non-magnetic filling elements 28 with which concave portions 26 between the recording elements 24A are filled. The magnetic recording medium 12 has a feature that surface concave portions 30 are formed in a surface 32 above the recording elements 24A as shown in the enlarged view of FIG. 3. The surface concave portion 30 has a cross-sectional shape of which a portion corresponding to a center of the recording element 24A lying thereunder in a width direction of the recording element 24A is recessed deepest toward the substrate 22 and has a width monotonically increasing with increase of a distance from the substrate 22. Please note that FIGS. 2 and 3 show the recording layer 24 is thicker than an actual recording layer as compared with other layers in order to facilitate understanding of the present invention. This is the same in FIG. 18 described before and FIGS. 4 to 9 and 13 to 17 described later.

A surface of the substrate 22 that faces the recording layer 24 is polished to be a mirror surface. Examples of the material of the substrate 22 include a non-magnetic material such as glass, an Al alloy covered with NiP, Si, or $Al_2O_3$.

The recording layer 24 has a thickness of 5 to 30 nm, and can be formed of a CoCr-based alloy such as a CoCrPt Alloy, a FePt-based alloy, a multilayer structure of them, or a material containing an oxide such as $SiO_2$ with ferromagnetic particles such as CoPt contained as a matrix.

The recording elements 24A are arranged in a data region to form concentric tracks at fine intervals in the radial direction. FIGS. 2 and 3 show those recording elements 24A. The "width direction of the recording element 24A" shall refer to a direction in which the top surface of the recording element 24A has the smallest width. In the first exemplary embodiment, the radial direction of the circular tracks is the width direction of the recording element 24A in the data region.

Moreover, the recording elements 24A are formed in a pattern representing predetermined servo information in a servo region (not shown).

A protective film 34 is formed on the recording elements 24A. In the data region, a top surface of the protective film 34 is formed to be recessed toward the substrate 22, so that the surface concave portions 30 are formed in the surface above the protective film 34 (above the recording elements 24A). The protective film 34 is also formed on side faces of the recording elements 24A and a bottom of the concave portions 26. The protective film 34 can be formed from any of Mo, W, Ta, TaSi, Zr, Nb, Ti, and oxides or nitrides of those materials or the like.

The surface concave portion 30 has a cross-sectional shape that is horizontally long and approximately V-shaped. The surface concave portions 30 are arranged along a circumferential direction of the track. It is preferable that a depth of the surface concave portions 30 be 0.1 to 4 nm.

Examples of the material of the filling elements 28 includes oxides such as $SiO_2$, $Al_2O_3$, $TiO_2$, and as ferrite, nitrides such as AlN, and carbides such as SiC or the like.

A protective layer 36 and a lubricating layer 38 are formed in that order over the protective film 34 (on the recording elements 24A) and over the filling elements 28. The protective layer 36 and the lubricating layer 38 are formed to have a shape following a shape of the top surfaces of the protective film 34 and filling elements 28. The aforementioned surface 32 is the top surface of the lubricating layer 38. That is, the aforementioned surface concave portions 30 are formed in the top surface of the lubricating layer 38.

The protective layer 36 has a thickness of 1 to 5 nm, and can be formed from hard carbon films that are called as diamond-like carbon, for example. Please note that the term "diamond-like carbon (hereinafter, referred to as "DLC")" in the present application shall refer to a material that mainly contains carbon and has an amorphous structure and Vickers hardness of about $2 \times 10^9$ to about $8 \times 10^{10}$ Pa. The lubricating layer 38 has a thickness of 1 to 2 nm. Fluorine containing lubricant such as PFPE (perfluoropolyether) can be used as a material for the lubricating layer 38.

An underlayer 40, an antiferromagnetic layer 42, a soft magnetic layer 44 and a seed layer 46 to provide magnetic anisotropy in a thickness direction (i.e., a direction perpendicular to the surface) to the recording layer 24 are formed between the substrate 22 and the recording layer 24. The underlayer 40 has a thickness of 2 to 40 nm and can be formed of Ta or the like. The antiferromagnetic layer 42 has a thickness of 5 to 50 nm and can be formed of a PtMn alloy, an RuMn alloy or the like. The soft magnetic layer 44 has a thickness of 50 to 300 nm and can be formed of an Fe (iron) alloy, a Co (cobalt) amorphous alloy, ferrite, or the like. The soft magnetic layer 44 may be formed as a multilayer structure of a layer having soft magnetism and a non-magnetic layer. The seed layer 46 has a thickness of 2 to 40 nm. Examples of a specific material of the seed layer 46 include a CoCr alloy that is non-magnetic, Ti, Ru, a multilayer structure of Ru and Ta, MgO or the like.

An operation of the magnetic recording medium 12 is now described.

Since the surface concave portions 30 are formed in the surface 32 of the magnetic recording medium 12, it is possible to prevent crash the magnetic head 14 against the magnetic recording medium 12 caused by stiction.

Moreover, a portion around the center of the recording element 24A in the width direction is mainly used for recording of information. Since the surface concave portion 30 has a cross-sectional shape of which a portion corresponding to a center of the recording element 24A lying thereunder in the width direction thereof is recessed deepest toward the substrate 22, and has a width monotonically increasing with the increase of the distance from the substrate 22, the center of the recording element 24A can be protected from contact with the magnetic head 14, even if the magnetic head 14 comes into contact with the surface 32 of the magnetic recording medium 12. Therefore, good magnetic property can be obtained. A method for forming the surface concave portions 30 is described later.

The protective film 34 and protective layer 36 are formed over the recording elements 24A. The recording elements 24A can also be protected from contact with the magnetic head 14 also in that respect.

In addition, concave portions are formed in the protective film 34 on the recording elements 24A and the surface concave portions 30 are formed to follow those concave portions, whereas the top surface of the recording elements 24A is flat. Therefore, variation in the size of the magnetic gap between the magnetic recording medium 12 and the magnetic head 14 can be suppressed. Also in that respect, good magnetic property can be obtained.

Since the surface concave portion 30 has a cross-sectional shape of which a portion corresponding to a center of the recording element 24A lying thereunder in the width direction thereof is recessed deepest toward the substrate 22, and has a width monotonically increasing with the increase of the distance from the substrate 22, the volume of the surface concave portions 30 can be kept small even when the width of the surface concave portion 30 on the magnetic head 14 side is made larger in order to prevent stiction of the magnetic head 14. The rigidity of a layer of air between the magnetic recording medium 12 and the magnetic head 14 is determined by the volume of the surface concave portions 30. Thus, the aforementioned cross-sectional shape of the surface concave portion 30 can improve the rigidity of the air layer between the magnetic recording medium 12 and the magnetic head 14.

Since the surface concave portions 30 are arranged along the circumferential direction of the tracks, i.e., a (relative) traveling direction of the magnetic head 14, variation in a flying height of the magnetic head 14 can be suppressed. Also in this respect, good magnetic property can also be achieved.

Since the recording elements 24A are arranged to form tracks in the data region of the magnetic recording medium 12, problems such as improper recording of information onto a track adjacent to a target track and crosstalk during reproducing hardly occur even when the areal density is high.

In the magnetic recording medium 12, the recording elements 24A are separated from each other and no recording layer 24 exists in the concave portions 26 between the recording elements 24A. Therefore, no noise is generated from the concave portions 26. Also in this respect, good recording/reproducing properties can also be achieved.

In the first exemplary embodiment, the protective film 34 is formed not only on the top surface of the recording elements 24A but also on the side faces of the recording elements 24A and the bottom of the concave portions 26 in the magnetic recording medium 12. However, the protective film 34 may be formed only on the top surface of the recording elements 24A, as in a second exemplary embodiment of the present invention shown in FIG. 4.

In the first exemplary embodiment, the concave portions are formed in the protective film 34 on the recording elements 24A and thereafter the surface concave portions 30 are formed to follow those concave portions, whereas the top surface of the recording elements 24A is flat. Alternatively, the concave portions in the protective film 34 may be formed to extend through the protective film 34 and reach the recording elements 24A, and thereafter the surface concave portions 30 may be formed to follow those concave portions, as in a third exemplary embodiment shown in FIG. 5. In this case, the effect of protecting the center of the recording element 24A, mainly used for recording of information, from contact with the magnetic head 14 can also be achieved.

In the first exemplary embodiment, the protective film 34 is formed on the recording elements 24A in the magnetic recording medium 12. Alternatively, the protective film 34 may be omitted, as in a fourth exemplary embodiment of the present invention shown in FIG. 6. In this case, concave portions are formed only in the top surface of the recording elements 24A and the surface concave portions 30 are formed to follow those concave portions. The effect of protecting the center of the recording element 24A, mainly used for recording of information, can also be achieved in this case.

In the first exemplary embodiment, the height of the top surface(at the highest portion) of the protective film 34 on the recording elements 24A is the same as the height of the top surface of the filling elements 28, and the surface 32 is flat except for the surface concave portions 30. Alternatively, the top surface(at the highest portion) of the protective film 34 on the recording elements 24A may be higher than the top surface of the filling elements 28 as in a fifth exemplary embodiment of the present invention shown in FIG. 7. That is, there may be steps between the surface 32 above the recording elements 24A and the surface 32 above the filling elements 28. Alternatively, the top surface of the filling elements 28 may be higher than the top surface of the protective film 34 on the recording elements 24A (at the highest portion) as in a sixth exemplary embodiment of the present invention shown in FIG. 8. In the fifth and sixth exemplary embodiments, it is preferable that the height of the steps between the surface 32 above the recording elements 24A and the surface 32 above the filling elements 28 be 2.5 nm or less in order to keep the sufficient rigidity of the air layer between the magnetic recording medium 12 and the magnetic head 14. Moreover, it is preferable that the surface 32 above the recording elements 24A be higher than the surface 32 above the filling elements 28 as in the fifth exemplary embodiment, in order to keep the magnetic gap between the magnetic head 14 and the magnetic recording medium 12 small.

Figure 9:
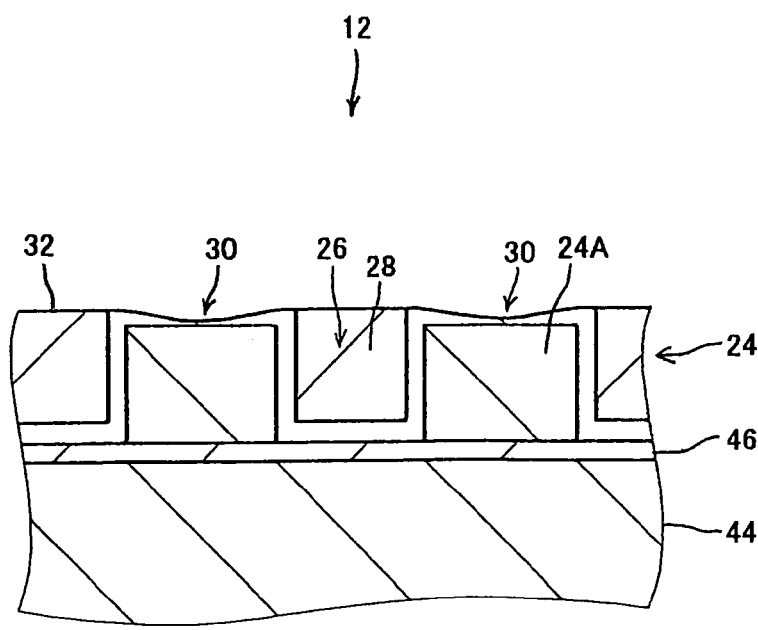
FIG. 9 is an enlarged side cross-sectional view schematically showing the structure of a magnetic recording medium around recording elements according to a seventh exemplary embodiment of the present invention.

In the first exemplary embodiment, the protective layer 36 and the lubricating layer 38 are formed on the protective film 34 (on the recording elements 24A) and the filling elements 28. Alternatively, the top surface of the protective film 34 and the top surface of the filling elements 28 may be exposed as in a seventh exemplary embodiment of the present invention that is shown in FIG. 9, for example. Also in this case, the effect of protecting the center of the recording element 24A, mainly used for recording of information, from contact with the magnetic head 14 can be achieved.

Figure 10:
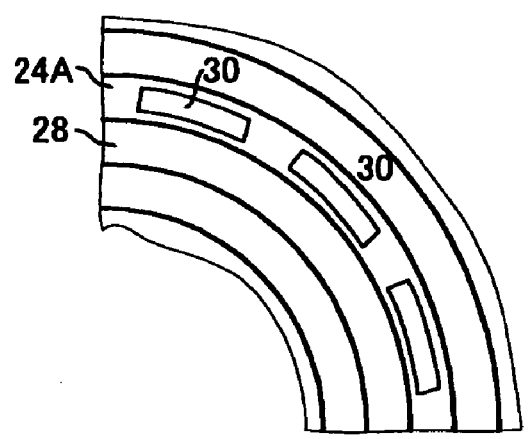
FIG. 10 is an enlarged plan view schematically showing a shape of a surface concave portion of a magnetic recording medium according to an eighth exemplary embodiment of the present invention.

In the first exemplary embodiment, the surface concave portions 30 are arranged along the circumferential direction of the track. In order to suppress the variation in the flying height of the magnetic head 14, it is preferable that one surface concave portion 30 be continuously formed for one recording element 24A in the circumferential direction of the track. Alternatively, as long as the magnetic head can have good flying property, a plurality of surface concave portions 30 may be formed for one recording element 24A intermittently in the circumferential direction of the track as in an eighth exemplary embodiment of the present invention shown in FIG. 10, for example.

Figure 11:
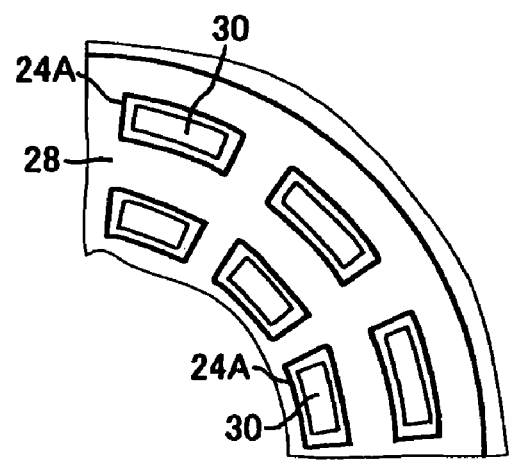
FIG. 11 is an enlarged plan view schematically showing a shape of a surface concave portion of a magnetic recording medium according to a ninth exemplary embodiment of the present invention.

In the first exemplary embodiment, the magnetic recording medium 12 is a discrete track medium in which the recording elements 24A are arranged at fine intervals in the radial direction of the track in the data region. In the case where the magnetic recording medium 12 is a patterned medium in which the recording elements 24A are arranged at fine intervals in both the radial and circumferential directions of the track, the surface concave portion 30 may be formed for every recording element 24A as in a ninth exemplary embodiment of the present invention shown in FIG. 11.

Figure 12:
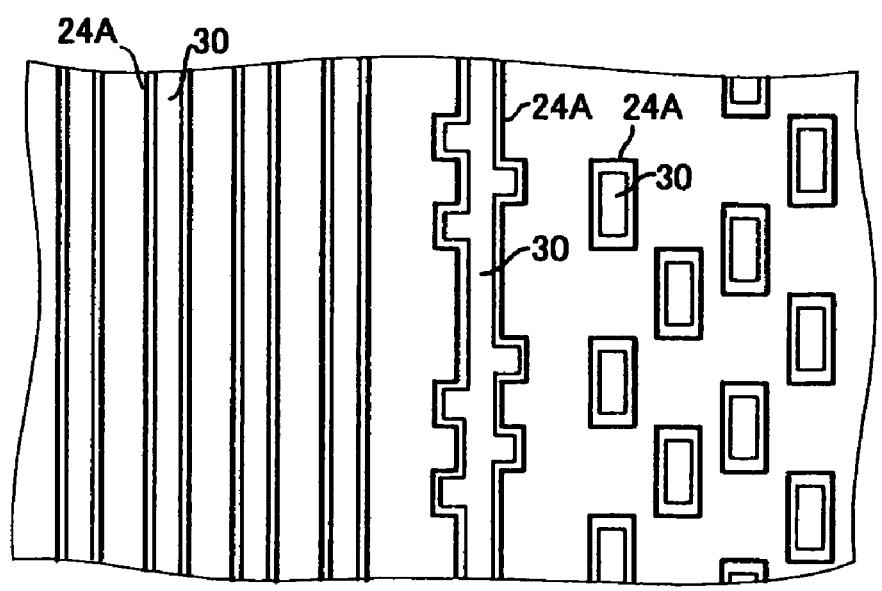
FIG. 12 is an enlarged plan view schematically showing a shape of a surface concave portion of a magnetic recording medium according to a tenth exemplary embodiment of the present invention.

In the first to ninth exemplary embodiments, an example is shown in which the surface concave portions 30 are formed in the surface 32 above the recording elements 24A in the data region. Furthermore, the surface concave portions 30 may be formed in the surface above the recording elements 24A formed in a servo pattern in the servo region as in a tenth exemplary embodiment of the present invention shown in FIG. 12. The effect of preventing crash of the magnetic head 14 against the magnetic recording medium 12 caused by stiction can also be achieved also in this case. By forming the surface concave portion 30 in the servo region to have a cross-sectional shape of which a portion corresponding to a center of the recording element 24A lying thereunder in the width direction thereof is recessed deepest toward the substrate 22, and has a width monotonically increasing with the increase of the distance from the substrate 22, the effect of protecting the center of the recording element 24A from contact with the magnetic head 14 can be achieved also in the servo region. Moreover, the volume of the surface concave portions 30 is suppressed to be small. Therefore, the effect of improving the rigidity of the air layer between the magnetic recording medium 12 and the magnetic head 14 can be achieved also in the servo region.

In addition, when the surface concave portions 30 are formed in the surface 32 above the recording elements 24A in both the data region and the servo region, the effect of preventing crash of the magnetic head 14 caused by stiction can be further enhanced.

In the first exemplary embodiment, the underlayer 40, the antiferromagnetic layer 42, the soft magnetic layer 44, and the seed layer 46 are formed between the substrate 22 and the recording layer 24. However, the structure of the layers between the substrate 22 and the recording layer 24 can be changed in an appropriate manner in accordance with a type of a magnetic recording medium or needs. Moreover, the underlayer 40, the antiferromagnetic layer 42, the soft magnetic layer 44, and the seed layer 46 may be omitted so that the recording layer 24 is formed directly on the substrate 22.

Although the magnetic recording medium 12 is a perpendicular recording type magnetic disk in the first exemplary embodiment, the present invention can also be applied to a longitudinal recording type magnetic disk.

In the first exemplary embodiment, the recording layer 24 and other layers are formed on one side of the substrate 22 in the magnetic recording medium 12. However, the present invention can also be applied to a double-sided recording type magnetic recording medium in which a recording layer and other layers are formed on both sides of a substrate.

The magnetic recording medium 12 is a discrete track medium in the first exemplary embodiment, and is a patterned medium in the ninth exemplary embodiment. However, the present invention can also be applied to a magnetic disk having a spirally formed track. Moreover, the present invention can also be applied to a magneto-optical disc such as an MO, a heat assisted magnetic disk that uses magnetism and heat together, and other magnetic recording media that have a shape different from the disk shape and include a recording layer formed in a concavo-convex pattern, such as a magnetic tape.

WORKING EXAMPLES

Eight types of magnetic recording media 12 having the structures that were the same as that of the first exemplary embodiment (see FIG. 3 and other drawings), that of the third exemplary embodiment (see FIG. 5) and that of the fifth exemplary embodiment (see FIG. 7) were manufactured. Ten magnetic recording media 12 were manufactured for each of the eight types. The structure of the main part of the manufactured magnetic recording media 12 is described below.

The substrate 22 has a diameter of approximately 65 mm and is formed of glass. The recording layer 24 has a thickness of approximately 20 nm and is formed of a CoCrPt alloy. The filling elements 28 are formed of $SiO_2$. The protective layer 36 has a thickness of approximately 2 nm and is formed of DLC. The lubricating layer 38 has a thickness of approximately 1 nm and is formed of PFPE.

A specific manufacturing method of those magnetic recording media 12 is now described briefly. First, the underlayer 40, the antiferromagnetic layer 42, the soft magnetic layer 44, the seed layer 46, and a continuous recording layer (unprocessed recording layer 24), a first mask layer, and a second mask layer were formed over the substrate 22 in that order by sputtering. Then, a layer of resist was applied by spin coating. The first mask layer has a thickness of approximately 25 nm and is formed of TaSi. The second mask layer has a thickness of approximately 10 nm and was formed of Ni. The resist layer has a thickness of approximately 100 nm. Negative type resist (NEB22A manufactured by Sumitomo Chemical Co., Ltd.) is used as the material for the resist layer.

A concavo-convex pattern corresponding to a servo pattern in the servo region and a track pattern in the data region was then transferred onto the resist layer by nano-imprinting by using a transfer apparatus (not shown). The resist layer on the bottom of the concave portions was then removed by reactive ion beam etching using $O_2$ gas. Then, the second mask layer under the bottom of the concave portions was removed by ion beam etching using Ar gas, and the first mask layer under the bottom of the concave portions was removed by reactive ion etching using $SF_6$ gas as reactive gas. Then, the continuous recording layer under the bottom of the concave portions was removed by reactive ion etching using CO gas and $NH_3$ gas serving as a reactive gas, thereby dividing the continuous recording layer into a number of recording elements 24A. In this manner, the recording layer 24 in the concavo-convex pattern was formed. The aforementioned series of processes were performed in such a manner that a track pitch (a pitch of the recording elements 24A in a track-width direction) in the data region was approximately 200 nm and the width of the recording element 24A on its top surface (i.e., the track width) was approximately 100 nm. Then, the first mask layer left on the recording elements 24A was completely removed by reactive ion etching using $SF_6$ gas serving as a reactive gas.

Then, the protective film 34 of Mo (molybdenum) was deposited on the recording elements 24A to have a thickness of approximately 3 nm by sputtering. In this deposition, a deposition power (a power applied to target) was set to approximately 500 W and a pressure in a vacuum chamber was set to approximately 0.3 Pa. The protective film 34 was also deposited on the side faces of the recording elements 24A and the bottom of the concave portions 26. Alternatively, the protective film 34 may be formed between the continuous recording layer and the first mask layer in advance and may be divided together with the continuous recording layer when the continuous recording layer is processed. In this case, a magnetic recording medium in which the protective film 34 is formed only on the top surface of the recording elements 24A, i.e., no protective film 34 is formed on the bottom and the side faces of the concave portions 26 can be obtained as in the aforementioned second exemplary embodiment (see FIG. 4).

Figure 13:
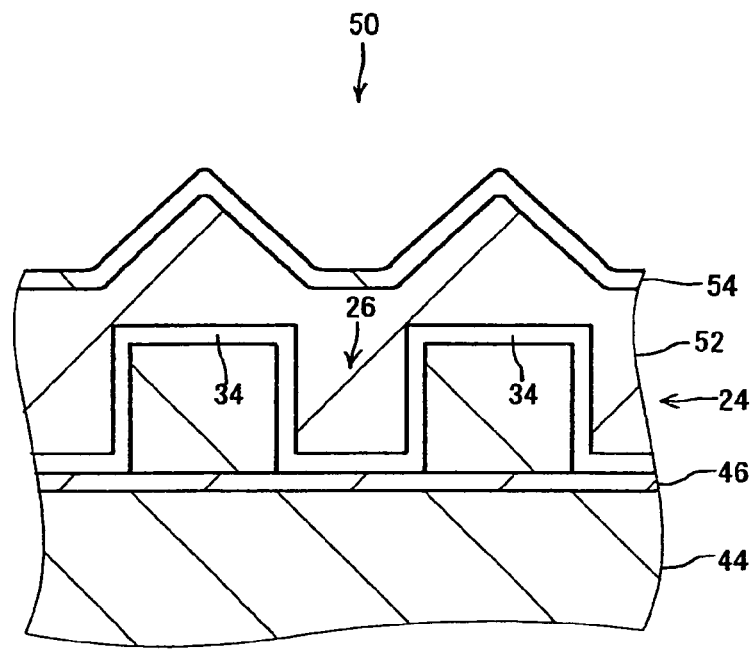
FIG. 13 is an enlarged side cross-sectional view schematically showing the state where a filling material and a covering material have been deposited over a surface of an object to be processed in a manufacturing process of a magnetic recording medium in Working Examples of the present invention.

Then, a filling material 52 (a material for the filling elements 28) was deposited on a surface of an object to be processed 50 that was obtained by the above processes to have a thickness of approximately 25 nm (this thickness was a thickness above the recording elements 24A) by bias sputtering, as shown in FIG. 13. In this deposition, a deposition power was set to approximately 500 W, a pressure in a vacuum chamber was set to approximately 0.3 Pa, and a bias power applied to the object to be processed 50 was set to approximately 290 W. The filling material 52 was deposited on the object to be processed 50 to cover the recording elements 24A in a shape which follows the concavo-convex pattern of the recording layer 24 and in which concavity and convexity are suppressed to some degree. In this manner, the concave portions 26 were filled with the filling material 52.

Then, a covering material 54 was deposited on the filling material 52 to have a thickness of 3 to 7 nm by sputtering. A deposition power was set to approximately 500 W and a pressure in a vacuum chamber was set to approximately 0.3 Pa. Mo that has a lower etching rate than $SiO_2$ in ion beam etching at a small incident angle was used as the covering material 54. Instead of Mo, Cr or Zr may be used. Please note that FIG. 13 shows the concavo-convex shape with exaggeration as compared with an actual state in order to facilitate understanding of this Working Examples. The thickness of the covering material 54 in each of eight types of objects to be processed 50 is shown in Table 1. The thickness of the covering material 54 in Table 1 is an average value obtained for ten objects to be processed 50 of each type.

Then, as shown in FIGS. 14 to 17 the covering material 54 and the filling material 52 over the surface of the object to be processed 50 were removed by performing ion beam etching using Ar gas, while the object to be processed 50 was rotated. In this manner, the surface of the object to be processed 50 was flattened. In this etching, a process time in which etching was performed was adjusted for each of the eight types of objects to be processed 50, so that the shape of the surface above the recording elements 24A and filling elements 28 was different between the eight types. Specific process times are shown in Table 1.

TABLE 1

| Type | | Depth of surface concave portions (nm) | Step height between a surface above recording elements and that above filling elements (nm) | Thickness of a covering material (nm) | Time of a flattening process (SEC) | The number of media causing crash | Variation of flying height (nm) |
|---|---|---|---|---|---|---|---|
| Working Example | A | 0.1 | 0.0 | 3.0 | 65 | 0 | 2 |
| | B | 1.0 | 0.0 | 4.0 | 80 | 0 | 2 |
| | C | 2.0 | 0.0 | 5.0 | 95 | 0 | 2 |

TABLE 1-continued

| Type | Depth of surface concave portions (nm) | Step height between a surface above recording elements and that above filling elements (nm) | Thickness of a covering material (nm) | Time of a flattening process (SEC) | The number of media causing crash | Variation of flying height (nm) |
|---|---|---|---|---|---|---|
| D | 3.0 | 0.0 | 6.0 | 110 | 0 | 2 |
| E | 4.0 | 0.0 | 7.0 | 125 | 0 | 2 |
| F | 3.0 | 2.0 | 6.0 | 116 | 0 | 2 |
| G | 3.0 | 2.5 | 6.0 | 119 | 0 | 3 |
| H | 3.0 | 3.0 | 6.0 | 122 | 0 | 5 |
| Comparative Example | 0.0 | 0.0 | — | — | 6 | 2 |

Figure 14:
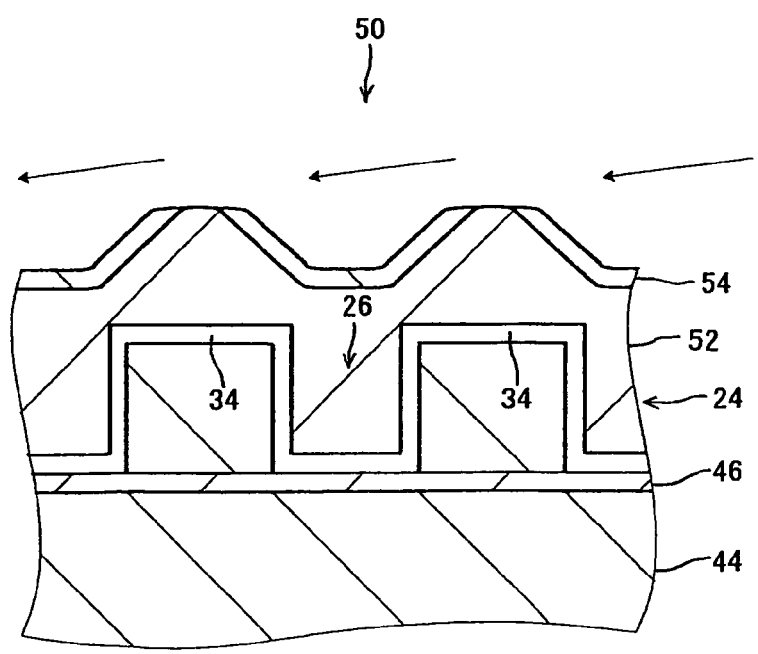
FIG. 14 is a side cross-sectional view schematically showing the state where the covering material has been removed at convex portions by a flattening process.

An incident angle of Ar gas was set to about 2° with respect to the surface of the object to be processed 50. Making Ar gas incident on the surface of the object to be processed 50 from a direction different from a perpendicular direction makes an etching rate at convex portions in the surface of the object to be processed 50 higher than that at concave portions significantly. Therefore, as shown in FIG. 14, the covering material 54 was removed faster at the convex portions than at the concave portions, so that the filling material 52 at the convex portions above the recording elements 24A were exposed.

Figure 15:
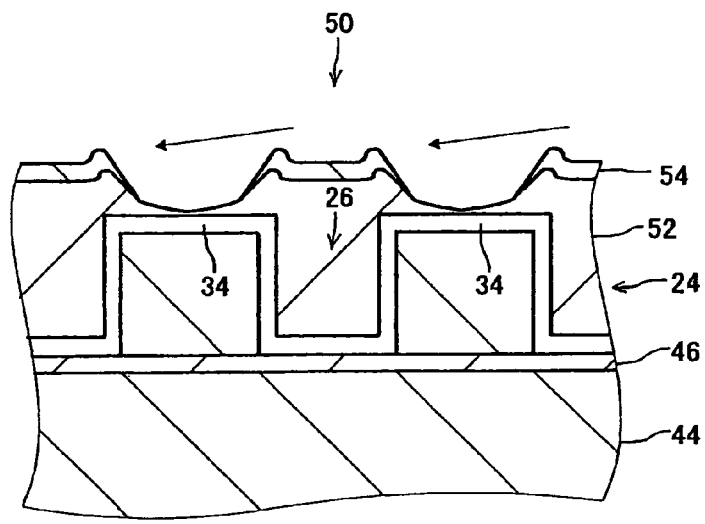
FIG. 15 is a side cross-sectional view schematically showing the state where etching of the filling material has been made progress more at the convex portions than at other portions.
Figure 16:
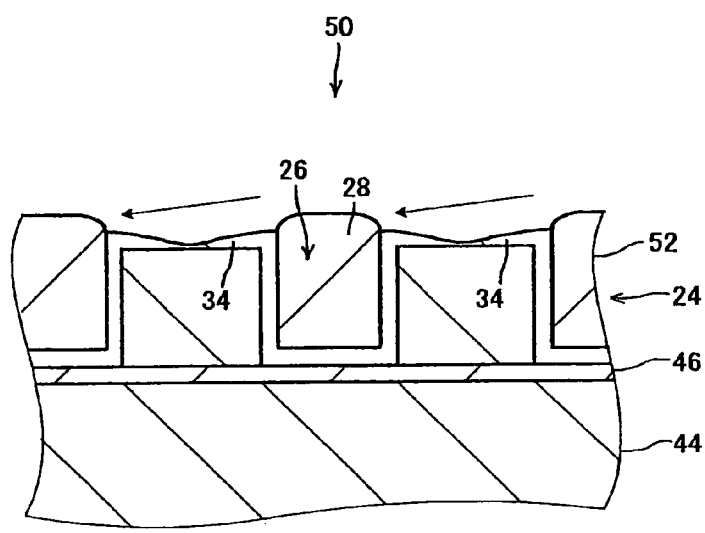
FIG. 16 is a side cross-sectional view schematically showing the state where a concavo-convex shape of the filling material has been reversed from that at the time of deposition of the filling material.
Figure 17:
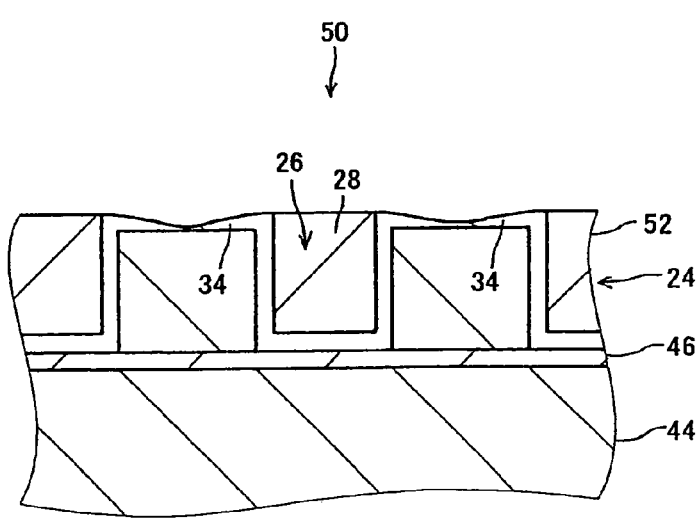
FIG. 17 is a side cross-sectional view schematically showing the state where a top surface of a protective film on the recording elements has been processed to have a cross-sectional shape of which a portion corresponding to a center of the recording element lying thereunder in a width direction thereof is deepest recessed toward a substrate, and has a width monotonically increasing with increase of a distance from the substrate.
Figure 18:
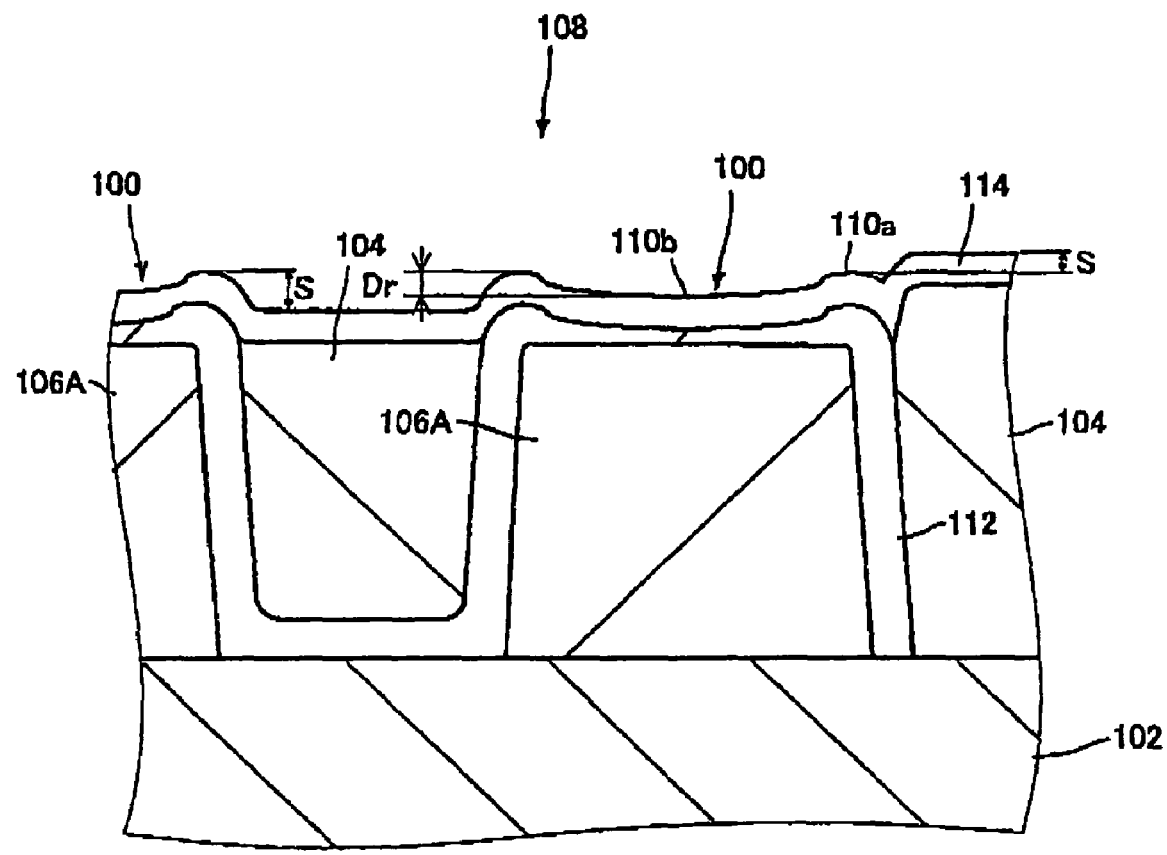
FIG. 18 is a side cross-sectional view schematically showing a depth of surface concave portions and steps between a surface of the magnetic recording medium above the recording elements and the surface above the filling elements in the present application.

When etching further made progress, the filling material 52 at the convex portions that was not covered with the covering material 54 was removed faster than that at other portions. That is, the filling material 52 was removed faster above the recording elements 24A than above the concave portions 26, as shown in FIG. 15. Thus, the concavo-convex shape was reversed from that when the layers were deposited, as shown in FIG. 16. More specifically, the top surface of the protective film 34 on the recording element 24A was processed to have a cross-sectional shape of which a portion corresponding to a center of the recording element 24A lying thereunder in the width direction thereof was deepest recessed toward the substrate 22, and had a width monotonically increasing with the increase of the distance from the substrate 22. The top surface of the recording elements 24A was protected by the protective film 34 from the processes and therefore was kept flat. When etching further made progress, the height of the top surface of the filling elements 28 and the height of the top surface (at the highest portion) of the protective film 34 became approximately equal to each other, as shown in FIG. 17. That is, the surface of the object to be processed 50 was flattened except for the concave portions in the top surface of the protective film 34.

Then, the protective layer 36 of DLC was formed on the protective film 34 (on the recording elements 24A) and the filling elements 28 by CVD to have a thickness of approximately 2 nm. Then, the lubricating layer 38 of PFPE was applied onto the protective layer 36 by dipping to have a thickness of 1 to 2 nm. The protective layer 36 and the lubricating layer 38 were deposited in a shape following the shape of the top surface of the protective film 34 (on the recording elements 24A) and the shape of the top surface of the filling elements 28. In this manner, the surface concave portions 30 shown in FIGS. 3 and 7 described above were formed.

The shape, width, depth, and the like of the concave portions formed in the protective film 34 (on the recording elements 24A) can be controlled by adjusting the deposition power, the bias power, the gas pressure, and the like and selecting the type of process gas, the materials for the filling material 52, covering material 54, and protective film 34, and the like in deposition process of the filling material 52 and the flattening process.

As described above, the surface concave portions can be formed by using a process for filling the concavo-convex pattern of the recording layer 24 and a flattening process. Thus, this formation method has better productivity than the aforementioned method that forms a texture pattern on the surface of the magnetic recording medium by performing a texture process for the substrate. Moreover, according to the Working Examples of the invention, desired concave portions are formed in the top surface of the protective film 34 that is closer to the surface of the magnetic recording medium than the top surface of the substrate, and thereafter the surface concave portions 30 are formed by forming the protective layer 36 and the lubricating layer 38 in such a manner that the shape of those layers follow the concave portions in the protective film 34. Therefore, the surface concave portions 30 can have a shape that is closer to a desired shape, as compared with a shape obtained by the method forming the texture pattern on the surface of the magnetic recording medium by performing a texture process for the substrate.

The depth of the surface concave portions 30 and the step height between the surface 32 above the recording elements 24A and the surface 32 above the filling elements 28 were measured by using ARM (Atomic Force Microscope) for each of the eight types of magnetic recording media 12 thus obtained. The measurement results are shown in Table 1. Please note that values in Table 1 are average values obtained for ten magnetic recording media 12 of each type. Moreover, values of the step height of Working Examples F to H represent that the surface 32 above the recording elements 24A is higher than the surface 32 above the filling elements 28 by the height represented by those values in Working Examples F to H.

In addition, for each of the eight types of magnetic recording media 12, a seek test of the magnetic head 14 was performed 100,000 times in a 2-mm-wide zone from 18 to 20 mm from the center of the medium in the radial direction. In the seek test, a suspension load of the magnetic head 14 was adjusted to achieve a flying height of 10 nm and an average seek time was set to 12 ms. After the seek test, observation was performed for each magnetic head 14 to check a scar of crash of the magnetic head 14 against the magnetic recording medium.

Moreover, the variation value of the flying height of the magnetic head 14 was measured by using LDV (Laser Doppler Vibrometer), while a flying position of a slider of the magnetic head 14 was kept at a position away from the center of the magnetic recording medium 12 in the radial direction by 20 mm.

The results of the measurement and observation are also shown in Table 1. The result of the observation of the crash scar is represented as the number of magnetic recording media causing crash. The variation value of the flying height of the magnetic head 14 shown in Table 1 is an average value obtained for ten magnetic recording media 12 of each type.

COMPARATIVE EXAMPLE

Ten substrates each of which was polished to have a mirror surface were prepared, unlike Working Examples above. The protective layer 36 and the lubricating layer 38 were formed over each substrate as in Working Examples. The seek test of the magnetic head 14 was performed 100,000 times for each substrate. A condition of the seek test was the same as that in Working Examples. After the seek test, observation was performed for each magnetic head 14 to check a scar of crash of the magnetic head 14. In addition, the variation value of the flying height of the magnetic head 14 was measured in the same manner as that in Working Examples. The results of the measurement and observation are also shown in Table 1.

As shown in Table 1, crash occurred for six of the ten substrates in Comparative Example. On the other hand, no crash occurred for ten magnetic recording media 12 of each of eight types, i.e., for a total of eighty magnetic recording media 12 in Working Examples. This means that an effect of suppressing occurrence of crash was extremely high in Working Examples, as compared with Comparative Example. The reason for this is considered as follows. In Comparative Example, the substrate was polished to have a mirror face and therefore crash caused by stiction of the magnetic head could occur easily. On the other hand, in Working Examples, the surface concave portions 30 were formed in the surface 32 of the magnetic recording medium 12. It is considered that those surface concave portions 30 suppressed crash caused by stiction of the magnetic head.

Moreover, for a hard disk, a target variation value of the flying height of the magnetic head in order to achieve good recording/reproducing properties is 3 nm or less. Table 1 shows that the variation value of the flying height of the magnetic head exceeded 3 nm only in Working Example H in which the step height between the surface 32 above the recording elements 24A and the surface 32 above the filling elements 28 was 3 nm. In Working Examples A to G in which the step height between the surface 32 above the recording elements 24A and the surface 32 above the filling elements 28 was 2.5 nm or less, the variation value of the flying height of the magnetic head was 3 nm or less. This means that the variation value of the flying height of the magnetic head can be surely suppressed to 3 nm or less by keeping the step height between the surface 32 above the recording elements 24A and the surface 32 above the filling elements 28 in a range from 0 to 2.5 nm.

What is claimed is:

1. A magnetic recording medium comprising:
    recording elements formed as a convex portion of a recording layer, which is formed in a concavo-convex pattern over a substrate; and
    filling elements with which concave portions between the recording elements are filled, wherein
    a surface concave portion is formed in a surface of the magnetic recording medium above the recording element in a data region, the surface concave portion having a cross-sectional shape which is anyone of a V-shape, a U-shape and a shape of a circular arc in a section perpendicular to a circumferential direction of a track, the cross-sectional shape having a deepest portion above a center of an underlying recording element in a width direction of the track and having a width monotonically increasing with increase of a distance from the substrate.

2. The magnetic recording medium according to claim 1, wherein
    the recording elements are formed of a shape of the track in the data region, and the surface concave portion is formed along the circumferential direction of the track.

3. The magnetic recording medium according to claim 1, wherein
    a protective film is formed over the recording elements, and a top surface of the protective film is formed to be recessed toward the substrate, thereby forming the surface concave portion in the surface of the magnetic recording medium above the protective film.

4. The magnetic recording medium according to claim 1, wherein
    a depth of the surface concave portion is 0.1 to 4 nm.

5. The magnetic recording medium according to claim 1, wherein
    a step height between a surface of the magnetic recording medium above the recording element and that above the filling element is 0 to 2.5 nm.

6. A magnetic recording and reproducing apparatus comprising:
    the magnetic recording medium according to claim 1; and
    a magnetic head, arranged to be flyable above the surface of the magnetic recording medium, for performing recording/reproducing of data for the magnetic recording medium.

7. A magnetic recording medium comprising:
    recording elements formed as a convex portion of a recording layer, which is formed in a concavo-convex pattern over a substrate; and
    filling elements with which concave portions between the recording elements are filled, wherein
    a top surface of the recording elements are formed to be recessed toward the substrate, thereby forming a surface concave portion in a surface of the magnetic recording medium above the recording element in a data region, the surface concave portion having a cross-sectional shape in a section perpendicular to a circumferential direction of a track, the cross-sectional shape having a deepest portion above a center of an underlying recording element in a width direction of the track and having a width monotonically increasing with increase of a distance from the substrate.

8. The magnetic recording medium according to claim 7, wherein
    the recording elements are formed of a shape of the track in the data region, and the surface concave portion is formed along the circumferential direction of the track.

9. The magnetic recording medium according to claim 7, wherein
    a protective film is formed over the recording elements, and a top surface of the protective film is formed to be recessed toward the substrate, thereby forming the surface concave portion in the surface of the magnetic recording medium above the protective film.

10. The magnetic recording medium according to claim 7, wherein
    a depth of the surface concave portion is 0.1 to 4 nm.

11. The magnetic recording medium according to claim 7, wherein
    a step height between a surface of the magnetic recording medium above the recording element and that above the filling element is 0 to 2.5 nm.

12. A magnetic recording and reproducing apparatus comprising:
the magnetic recording medium according to claim 7; and
a magnetic head, arranged to be flyable above the surface of the magnetic recording medium, for performing recording/reproducing of data for the magnetic recording medium.

13. A magnetic recording medium comprising:
recording elements formed as a convex portion of a recording layer, which is formed in a concavo-convex pattern over a substrate;
a protective film formed over the recording elements;
filling elements with which concave portions between the recording elements are filled;
a protective layer formed over the protective film and the filling elements; and
a lubricant layer formed over the protective layer, wherein
a top surface of the protective film is formed to be recessed toward the substrate, thereby forming a surface concave portion in a surface of the magnetic recording medium above the recording element in a data region, the surface concave portion having a cross-sectional shape in a section perpendicular to a circumferential direction of a track, the cross-sectional shape having a deepest portion above a center of an underlying recording element in a width direction of the track and having a width monotonically increasing with increase of a distance from the substrate.

14. The magnetic recording medium according to claim 13, wherein
the recording elements are formed of a shape of the track in the data region, and the surface concave portion is formed along the circumferential direction of the track.

15. The magnetic recording medium according to claim 13, wherein
a depth of the surface concave portion is 0.1 to 4 nm.

16. The magnetic recording medium according to claim 13, wherein
a step height between a surface of the magnetic recording medium above the recording element and that above the filling element is 0 to 2.5 nm.

17. A magnetic recording and reproducing apparatus comprising:
the magnetic recording medium according to claim 13; and
a magnetic head, arranged to be flyable above the surface of the magnetic recording medium, for performing recording/reproducing of data for the magnetic recording medium.

* * * * *